(12) United States Patent
Borroni-Bird et al.

(10) Patent No.: US 7,509,195 B2
(45) Date of Patent: Mar. 24, 2009

(54) DRIVER CONTROL INPUT DEVICE FOR DRIVE-BY-WIRE SYSTEM

(75) Inventors: Christopher E. Borroni-Bird, Oakland Township, MI (US); Adrian B. Chernoff, Boulder, CO (US); James T. Embach, Rochester Hills, MI (US); Julien Montousse, Madison Heights, MI (US); Mohsen D. Shabana, Farmington Hills, MI (US); Joseph F. Szczerba, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 211 days.

(21) Appl. No.: 11/558,481

(22) Filed: Nov. 10, 2006

(65) Prior Publication Data
US 2007/0114773 A1    May 24, 2007

Related U.S. Application Data

(62) Division of application No. 10/347,137, filed on Jan. 17, 2003, now Pat. No. 7,142,963.

(51) Int. Cl.
B62D 21/11    (2006.01)

(52) U.S. Cl. ............... 701/41; 701/42; 180/244; 180/443; 180/444

(58) Field of Classification Search ............... 701/36, 701/41, 42; 280/788; 180/400, 444, 326, 180/244, 443
See application file for complete search history.

(56) References Cited

U.S. PATENT DOCUMENTS

| | | | |
|---|---|---|---|
| 4,640,340 A | 2/1987 | Noda et al. | 165/41 |
| 4,956,590 A | 9/1990 | Phillips | 318/432 |
| 4,993,734 A * | 2/1991 | Trema | 280/276 |
| 5,366,281 A | 11/1994 | Littlejohn | 303/3 |
| 5,823,636 A | 10/1998 | Parker et al. | 303/3 |
| 6,176,341 B1 | 1/2001 | Ansari | 180/402 |
| 6,208,923 B1 | 3/2001 | Hommel | 701/42 |

(Continued)

FOREIGN PATENT DOCUMENTS

EP    1777772 A1 *    4/2007

(Continued)

OTHER PUBLICATIONS

A Modular Control Architecture for a Small Electric Vehicle: Santos, F.; Trovao, J.; Marques, A.; Pedreiras, P.; Ferreira, J.; Almeida, L.; Santos, M.; Emerging Technologies and Factory Automation, 2006. ETFA '06 IEEE Conference on; Sep. 20-22, 2006 pp. 139-144; Digital Object Identifier 10.1109/ETFA.2006.355456.*

(Continued)

*Primary Examiner*—Cuong H Nguyen

(57) ABSTRACT

A driver control input device includes a support post and a steering ring rotatably supported with respect to the support post. A steering transducer is operatively connected between the steering ring and support post to convert mechanical rotation of the steering ring into non-mechanical steering control signals to be sent to a steer-by-wire system. A braking ring and acceleration ring may also be provided for generating non-mechanical braking and acceleration control signals.

16 Claims, 7 Drawing Sheets

U.S. PATENT DOCUMENTS

| | | | |
|---|---|---|---|
| 6,219,604 B1 | 4/2001 | Dilger et al. | 701/41 |
| 6,305,758 B1 | 10/2001 | Hageman et al. | 303/115.2 |
| 6,318,494 B1 | 11/2001 | Pattok | 180/402 |
| 6,360,149 B1 * | 3/2002 | Kwon et al. | 701/41 |
| 6,370,460 B1 | 4/2002 | Kaufmann et al. | 701/41 |
| 6,373,472 B1 | 4/2002 | Palalau et al. | 345/173 |
| 6,390,565 B2 | 5/2002 | Riddiford et al. | 303/3 |
| 6,394,218 B1 | 5/2002 | Heitzer | 180/402 |
| 6,424,900 B2 | 7/2002 | Murray et al. | 701/48 |
| 6,464,645 B1 | 10/2002 | Park et al. | 600/462 |
| 6,474,688 B1 | 11/2002 | Bogren et al. | 280/771 |
| 6,546,780 B1 | 4/2003 | Palfenier et al. | 73/1.75 |
| 6,612,392 B2 | 9/2003 | Park et al. | 180/402 |
| 6,712,164 B2 | 3/2004 | Chernoff et al. | 180/65.1 |
| 6,880,855 B2 | 4/2005 | Chernoff et al. | 280/778 |
| 7,019,623 B2 | 3/2006 | Klausner et al. | 340/425.5 |
| 7,142,963 B2 * | 11/2006 | Borroni-Bird et al. | 701/41 |
| 2002/0108804 A1 * | 8/2002 | Park et al. | 180/444 |
| 2003/0127272 A1 * | 7/2003 | Baker et al. | 180/326 |
| 2004/0129488 A1 | 7/2004 | Chernoff et al. | 180/333 |
| 2004/0143379 A1 * | 7/2004 | Borroni-Bird et al. | 701/36 |
| 2007/0114773 A1 * | 5/2007 | Borroni-Bird et al. | 280/788 |
| 2008/0210496 A1 * | 9/2008 | Ishii | 188/1.11 E |

FOREIGN PATENT DOCUMENTS

| | | | |
|---|---|---|---|
| JP | 2007120960 A | * | 5/2007 |
| JP | 2007125915 A | * | 5/2007 |
| JP | 2008174169 A | * | 7/2008 |
| WO | WO 2007003580 A1 | * | 1/2007 |

OTHER PUBLICATIONS

Automotive Electrical Actuation Technologies; Iies-Klumpner, D.; Serban, I.; Risticevic, M.; Vehicle Power and Propulsion Conference, 2006. VPPC '06. IEEE Sep. 6-8, 2006 pp. 1-6; Digital Object Identifier 10.1109/VPPC.2006.364364.*

Prime mover for hybrid electric propulsion system; Fijalkowski, B.T.; Power Electronics in Transportation, 1998; Oct. 22-23, 1998 pp. 109-116; Digital Object Identifier 10.1109/PET.1998.731066.*

* cited by examiner

DRIVER CONTROL INPUT DEVICE FOR DRIVE-BY-WIRE SYSTEM

CROSS-REFERENCE TO RELATED APPLICATIONS

This application is a Divisional of U.S. application Ser. No. 10/347,137 filed Jan. 17, 2003.

TECHNICAL FIELD

The present invention relates to a vehicle driver control input device for providing steering, acceleration and braking signals on a drive-by-wire vehicle.

BACKGROUND OF THE INVENTION

The implementation of drive-by-wire technology in the automotive industry (e.g. steer-by-wire, brake-by-wire, throttle-by-wire, shift-by-wire, etc.) is a result of continuing efforts to reduce cost, increase reliability, and reduce weight.

In drive-by-wire systems, mechanical devices with linkages and mechanical connections are being replaced with sensors, actuators and electronics. For example, in a conventional steering system, which consists of a steering wheel, a steering column, a power assisted rack and pinion system, and tie rods, the driver turns a steering wheel which, through the various mechanical components, causes the road wheels of the vehicle to turn. In a steer-by-wire system, a number of the mechanical components between the steering wheel and the road wheels of the vehicle are replaced with a sensor at the steering wheel and both sensors and actuators at the road wheels. In a steer-by-wire system, the rotation of the steering wheel is measured by the sensor. This rotation measurement is processed by the electronics to generate command signals for the actuators to turn the road wheels.

Drive-by-wire modules may reduce assembly time and cost and result in an improved driver interface because the elimination of mechanical connections to the steering column give engineers more flexibility in designing the driver interface with regard to location, type and performance. Vehicle designers will also have more flexibility in the placement of hardware under the hood and in the interior to support alternative power trains, enhanced styling, and improved interior functionality.

Without a steering column, there is no need to provide an adjustable seat, so seat content may be reduced. The absence of the steering column may also enable integrated vehicle stability control systems, collision avoidance systems, and automated driving systems.

Drive-by-wire technology may also increase packaging flexibility, simplify assembly, enable tunable steering feel, and advanced vehicle control.

SUMMARY OF THE INVENTION

A vehicle driver control input device in accordance with the invention is provided for use in a vehicle drive-by-wire system for steering, accelerating and braking a vehicle. Alternatively, the driver control input device may be used for a driving simulator, aircraft, video game, wheelchair, etc.

Advantageously, in accordance with one aspect of the invention, the driver control input device includes a support post and a steering ring rotatably supported with respect to the support post. A steering transducer is operatively connected between the steering ring and the support post to convert mechanical rotation of the steering ring into non-mechanical steering control signals to be sent to a steer-by-wire system.

A hub may be fixed to the post, and the steering ring may be rotatably supported with respect to the hub. The post may be adjustable, and the hub may be pivotal and adjustable with respect to the post. The hub may include an information display, an airbag, control features, such as control knobs, etc. Alternatively, the hub may be fixed to the steering ring for rotation therewith. Further, the design may be hubless.

A braking ring may be positioned adjacent the steering ring and operatively connected with a braking transducer to convert mechanical motion of the braking ring into non-mechanical braking control signals to be sent to a brake-by-wire system. As in other embodiments, the "ring" need not form a full circle; i.e., it may be U-shaped, etc.

An acceleration ring may be positioned adjacent the steering ring and operatively connected with an acceleration transducer to convert mechanical motion of the acceleration ring into non-mechanical acceleration control signals to be sent to an energy conversion system. Also, an acceleration button may be connected to the steering ring for providing non-mechanical acceleration signals to the energy conversion system as an alternative or redundant acceleration demand input device.

The steering ring, braking ring and accelerator ring may be substantially aligned with each other such that they share a common central axis, which is the axis of rotation of the steering ring.

The braking ring may be operatively connected adjacent a back side of the steering ring, and the acceleration ring may be operatively connected adjacent a front side of the steering ring.

Vehicle braking force or acceleration may be relative to the force applied to the braking ring, acceleration ring or acceleration button. Preferably, when a desired speed is achieved, the acceleration control device may be released, and the vehicle's speed will be maintained, such as by cruise control. In other words, the vehicle would maintain a steady speed unless acceleration or braking signals are being sent by a driver. The braking and acceleration features may alternatively include a compression sensor. Also, active force feedback is utilized to simulate vehicle dynamic conditions and enhance driving performance.

In one embodiment, the steering ring is substantially hollow and is positioned on a stationary wheel, and rotatable with respect to the stationary wheel via bearings on the stationary wheel abutting an inside surface of the hollow steering ring.

In another embodiment, the post rotatably supports the steering ring by engaging only a peripheral edge of the steering ring to thereby fully support the steering ring while enabling rotation of the steering ring via bearings connected to the post.

Preferably, the steering wheel is fully adjustable to optimize user comfort.

The invention may also provide a vehicle including a chassis, at least three wheels operable with respect to the chassis, a steer-by-wire system, a brake-by-wire system, and an energy conversion system responsive to non-mechanical control signals. A driver control input device is connected with the steer-by-wire system, brake-by-wire system and energy conversion system, as described above, to provide non-mechanical braking, steering, and acceleration signals The above objects, features and advantages, and other objects, features and advantages of the present invention are readily apparent from the following detailed description of the best modes for carrying out the invention when taken in connection with the accompanying drawings

DESCRIPTION OF THE PREFERRED EMBODIMENTS

Figure 1:
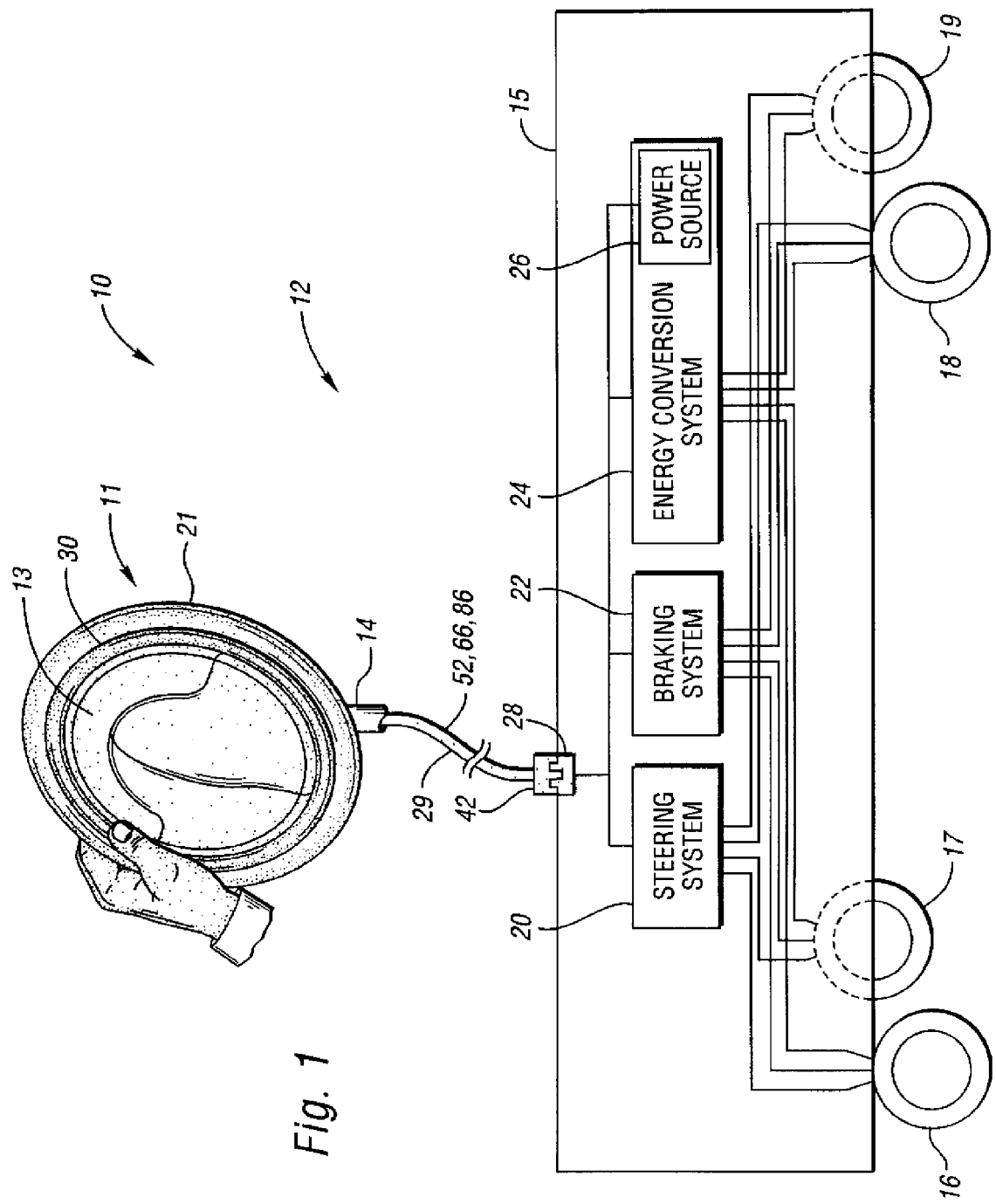
FIG. 1 is a schematic illustration (not to scale) of a vehicle incorporating a driver control input device in accordance with the invention.

Referring to FIG. 1, a vehicle 10 in accordance with the invention includes a vehicle drive system 12 and a chassis 15. The vehicle drive system 12 includes a driver control input device 11 which is operatively connected with a steering system 20, braking system 22 and energy conversion system 24. The chassis 15 includes a frame and has four wheels 16, 17, 18, 19 that are operable with respect to the chassis 15. The vehicle 10 is preferably an automobile, but the invention also contemplates that the vehicle may be a tractor, fork-lift or other industrial vehicle. Further, the driver control input device 11 may be used in a driving simulator, aircraft, wheelchair, video game, etc.

As shown, the driver control input device 11 includes a steering wheel hub 13 which is rotatable with respect to a support post 14. A steering ring 21 is supported by, and rotates with, the hub 13. A steering transducer, shown in FIG. 2, generates non-mechanical steering control signals 52 as the steering ring 21 is rotated with respect to the post 14. The transducer is preferably operatively connected at the pivot joint between the post 14 and the hub 13 to generate such steering signals. The steering control signals 52 are sent through the connector wire 29, through the connector ports 42, 28 to the steering system 20.

Figure 3:
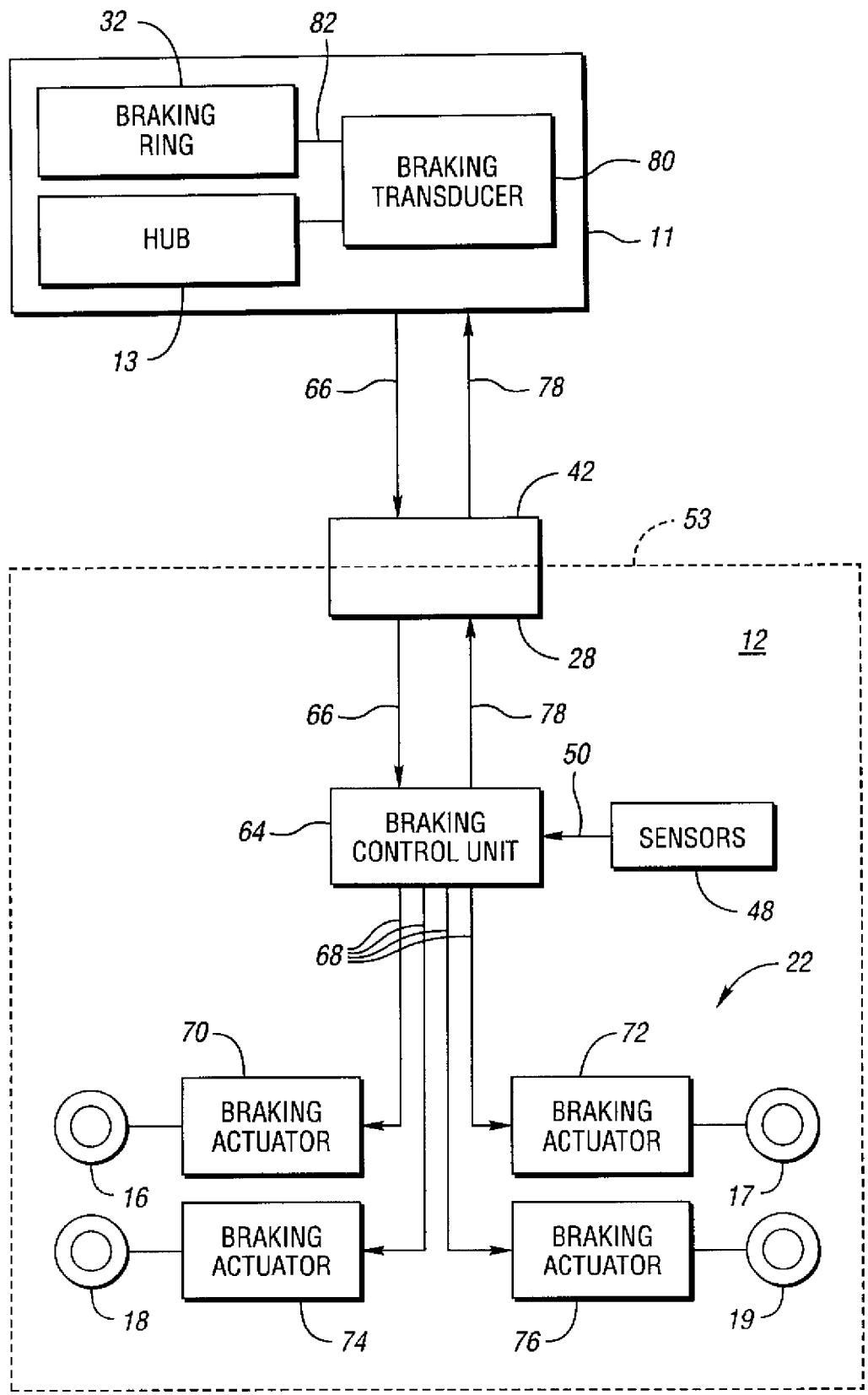
FIG. 3 is a schematic illustration of a braking system for use with the vehicle of FIG. 1.

The driver control input device 11 also includes an accelerator ring 30 which is operative to provide, via a transducer, energy conversion signals 86 through the connector wire 29 and connector ports 42, 28 to the energy conversion system 24, as described later with reference to FIGS. 3, 5 and 6.

The driver control input device 11 also includes a braking ring 32 (shown in FIGS. 5 and 6) which is operative to provide electrical braking control signals 66 through the connector wire 29 and connector ports 42, 28 to the braking system 22.

The steering system 20, braking system 22 and energy conversion system 24 are each mounted to a frame of the chassis 15 and are responsive to non-mechanical control signals. The energy conversion system 24 is connected to a power source 26. Embodiments of such systems are described subsequently with respect to FIGS. 2-4.

Still referring to FIG. 1, the chassis 15 includes a frame which provides a rigid structure to which the steering system 20, braking system 22 and energy conversion system 24 as well as the wheels 16, 17, 18, 19 are mounted, as shown schematically in FIG. 1, and is configured to support an attached body. A person of ordinary skill in the art will recognize that the chassis 15 can take many different forms. For example, the chassis 15 can be a traditional automotive frame having two or more longitudinal structural members spaced a distance apart from each other, with two or more transverse structural members space apart from each other and attached to both longitudinal structural members at their ends. Alternatively, the structural frame may also be in the form of a "belly pan", wherein integrated rails and cross members are formed in sheets of metal or other suitable material, with other formations to accommodate various system components. The structural frame may also be integrated with various vehicle components. Of course, the above description is merely exemplary, and the invention may alternatively be useful in a body-on-frame assembly, body-frame integral assembly, non-passenger vehicle, such as a forklift, etc.

As described previously, the chassis 15 includes the connector port 28, also referred to as a drive-by-wire connector port, that is mounted with respect to the chassis 15 and operably connected to the steering system 20, braking system 22 and energy conversion system 24. Persons skilled in the art will recognize various methods for mounting the connector port 28 to the chassis 15. In the preferred embodiment, the connector port 28 is located on a top face of the chassis 15, in reasonably close proximity to the driver control input device 11.

The connector port 28 of the preferred embodiment may perform multiple functions, or select combinations thereof. First, the connector port 28 may function as an electrical power connector, i.e., it may be configured to transfer electrical energy generated by components on the vehicle 10 to the operator interface or other non-frame destination. Second, the connector port 28 may function as a control signal receiver, i.e., a device configured to transfer non-mechanical control signals from a non-vehicle source, such as the driver control input device 11, to controlled systems including the steering system 20, braking system 22 and energy conversion system 24. Third, the connector port 28 may function as a feedback signal conduit through which feedback signals are made available to a vehicle driver. Fourth, the connector port 28 may function as an external programming interface through which software containing algorithms and data may be transmitted for use by controlled systems. Fifth, the connector port 28 may function as an information conduit through which sensor information and other information is made available to a vehicle driver. The connector port 28 may thus function as a communications and power "umbilical" port through which all communications between the vehicle and the attached driver control input device 11 and other attachments to the chassis are transmitted. The connector port 28 is essentially an electrical connector. Electrical connectors includes devices configured to operably connect one or more electrical wires with other electrical wires. The wires may be spaced a distance apart to avoid any one wire causing signal interference in another wire operably connected to an electrical connector or for any reason that wires in close proximity may not be desirable.

The steering system 20 is operatively connected to the front wheels 16, 17 (but may be connected to rear wheels). Preferably, the steering system 20 is responsive to non-mechanical control signals. In the preferred embodiment, the steering system 20 is by-wire. A by-wire system is characterized by control signal transmission in electrical form. In the context of the present invention, "by-wire" systems, or systems that are controllable "by-wire", include systems configured to receive control signals in electronic form via a control signal receiver and respond in conformity to the electronic control signals.

Figure 2:
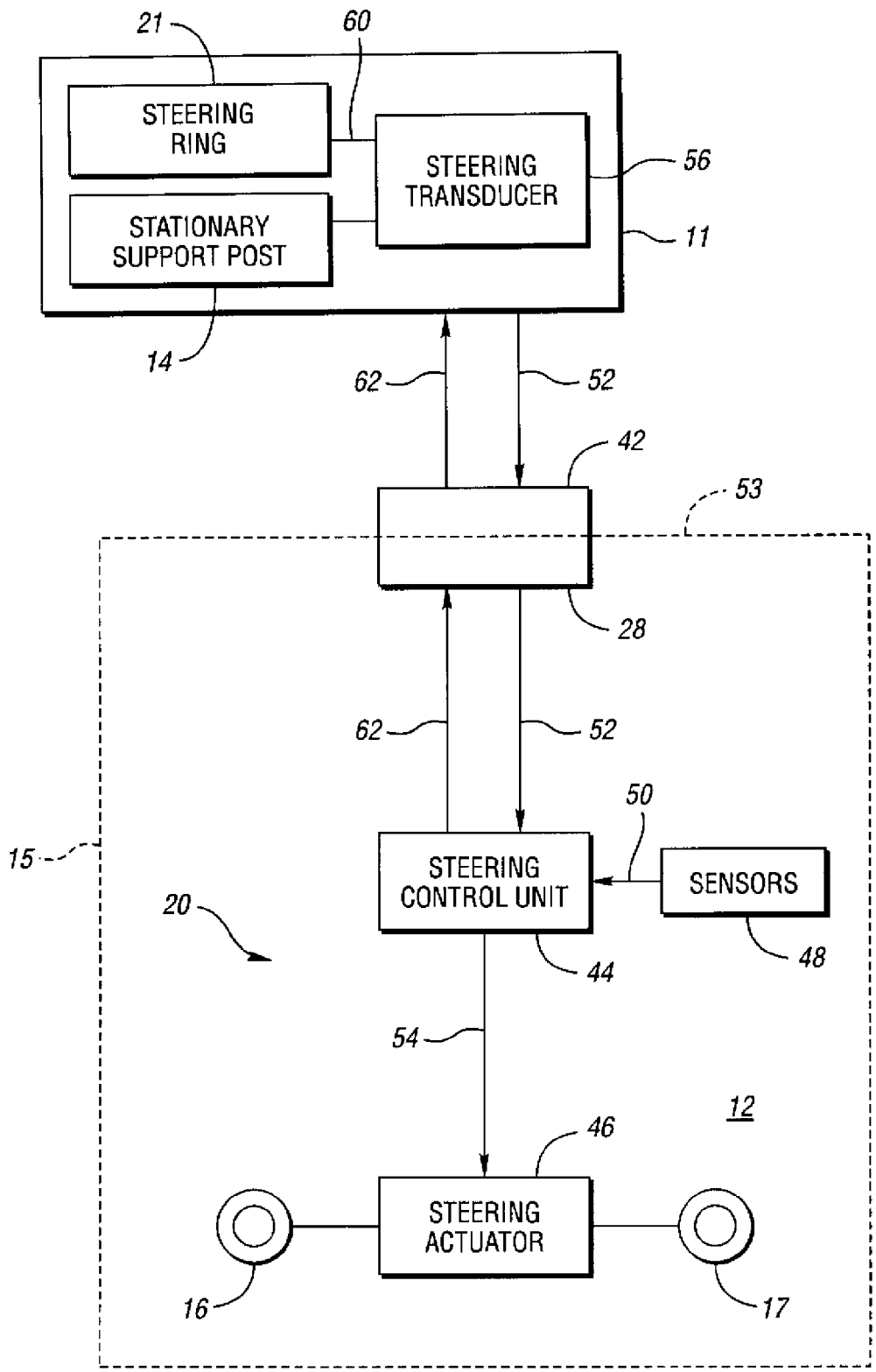
FIG. 2 is a schematic illustration of a steering system for use with the vehicle of FIG. 1.

FIG. 2 is a schematic illustration of a steering system for use with the mobility system of FIG. 1. The by-wire steering system 20 of the preferred embodiment includes a steering control unit 44, and a steering actuator 46. Sensors 48 are located on the vehicle 10 and transmit sensor signals 50 carrying information concerning the state or condition of the vehicle and its component systems. The sensors 48 may include position sensors, velocity sensors, acceleration sensors, pressure sensors, force and torque sensors, flow meters, temperature sensors, etc. The steering control unit 44 receives and processes sensor signals 50 from the sensors 48 and electrical steering control signals 52 from the connector port 28, and generates steering actuator control signals 54 according to a stored algorithm. A control unit typically includes a microprocessor, ROM and RAM and appropriate input and output circuits of a known type for receiving the various input signals and for outputting the various control commands to the actuators. Sensor signals 50 may include yaw rate, lateral acceleration, angular wheel velocity, tie-rod force, steering angle, chassis velocity, etc.

The steering actuator 46 is operably connected to the front wheels 16, 17 and configured to adjust the steering angle of the front wheels 16, 17 in response to the steering actuator control signals 54. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. In the preferred embodiment, the steering actuator 46 is an electric drive motor configured to adjust a mechanical steering rack.

Referring to FIG. 2, the preferred embodiment of the vehicle is configured such that it is steerable by any source of compatible electrical steering control signals 52 connected to the connector port 28. The connector port 28 interfits with the connector 42 at the connector interface 53. FIG. 2 depicts a steering transducer 56 located within the driver control input device 11, operatively connected between the steering ring 21 and the stationary support post 14, and connected to a complementary connector 42. Transducers convert the mechanical control signals of a vehicle driver to non-mechanical control signals. When used with a by-wire system, transducers convert the mechanical control signals to electrical control signals usable by the by-wire system. Transducers utilize sensors, typically position and force sensors, to convert the mechanical input to an electrical signal.

The complementary connector 42 is coupled with the connector port 28 of the connector interface 53. The steering transducer 56 converts vehicle driver-initiated mechanical movement 60 of the steering ring 21 into electrical steering control signals 52 which are transmitted via the connector port 28 to the steering control unit 44. The steering transducer 56 may include, for example, a curved rack and pinion with an optical sensor to sense the position of the pinion along the curved rack as the steering ring 21 is pivoted with respect to the support post 14. A motor may also be included and operatively engaged with the pinion to provide force feedback to the driver. In the preferred embodiment, the steering control unit 44 generates steering feedback signals 62 for use by a vehicle driver and transmits the steering feedback signals 62 through the connector port 28. Some of the sensors 48 monitor steering motion, such as motion along a rack, and vehicle speed. This information is processed by the steering control unit 44 according to a stored algorithm to generate the steering feedback signals 62.

Examples of steer-by-wire systems are described in U.S. Pat. No. 6,176,341, issued Jan. 23, 2001 to Delphi Technologies, Inc; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co. KG; which are hereby incorporated by reference in their entireties.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

Referring again to FIG. 1, a braking system 22 is mounted to the chassis 15 and is operably connected to the wheels 16, 17, 18, 19. The braking system 22 is configured to be responsive to non-mechanical control signals. In the preferred embodiment, the braking system 22 is by-wire, as depicted schematically in FIG. 3, wherein like reference numbers refer to like components from FIG. 2. Sensors 48 transmit sensor signals 50 carrying information concerning the state or condition of the vehicle and its component systems to a braking control unit 64. The braking control unit 64 is connected to the connector port 28 and is configured to receive electrical braking control signals 66 via the connector port 28. The braking control unit 64 processes the sensor signals 50 and the electrical braking control signals 66 and generates braking actuator control signals 68 according to a stored algorithm. The braking control unit 64 then transmits the braking actuator control signals 68 to braking actuators 70, 72, 74, 76 which act to reduce the angular velocity of the wheels 16, 17, 18, 19. Those skilled in the art will recognize the manner in which the braking actuators 70, 72, 74, 76 act on the wheels 16, 17, 18, 19. Typically, actuators cause contact between friction elements, such as pads and disc rotors. Optionally, an electric motor may function as a braking actuator in a regenerative braking system.

The braking control unit 64 may also generate braking feedback signals 78 for use by a vehicle driver and transmit the braking feedback signals 78 through the connector port 28. In the preferred embodiment, the braking actuators 70, 72, 74, 76 apply force through a caliper to a rotor at each wheel. Some of the sensors 48 measure the applied force on each caliper. The braking control unit 64 uses this information to ensure synchronous force application to each rotor.

The preferred embodiment of the vehicle is configured such that the braking system 22 is responsive to any source of compatible electrical braking control signals 66. At least one braking transducer 80 is located in the driver control input device 11 operatively connected between the braking ring 32 and the hub 13, and connected to a complementary connector 42 interfitted with the connector port 28 at the connector interface 53. The braking transducer 80 converts vehicle driver-initiated mechanical movement 82 of the braking ring 32 into electrical form and transmits the electrical braking control signals 66 to the braking control unit via the connector port 28 when the braking ring 32 is squeezed toward the hub 13 by a driver. The braking transducer 80 includes sensors that measure both the rate of applied force and the amount of applied force to the braking ring 32, thereby converting mechanical movement 82 of the braking ring 32 into electrical braking control signals 66. The braking control unit 64 processes both the rate and amount of applied force to provide both normal and panic stopping.

Examples of brake-by-wire systems are described in U.S. Pat. No. 5,366,281, issued Nov. 22, 1994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S. Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Figure 4:
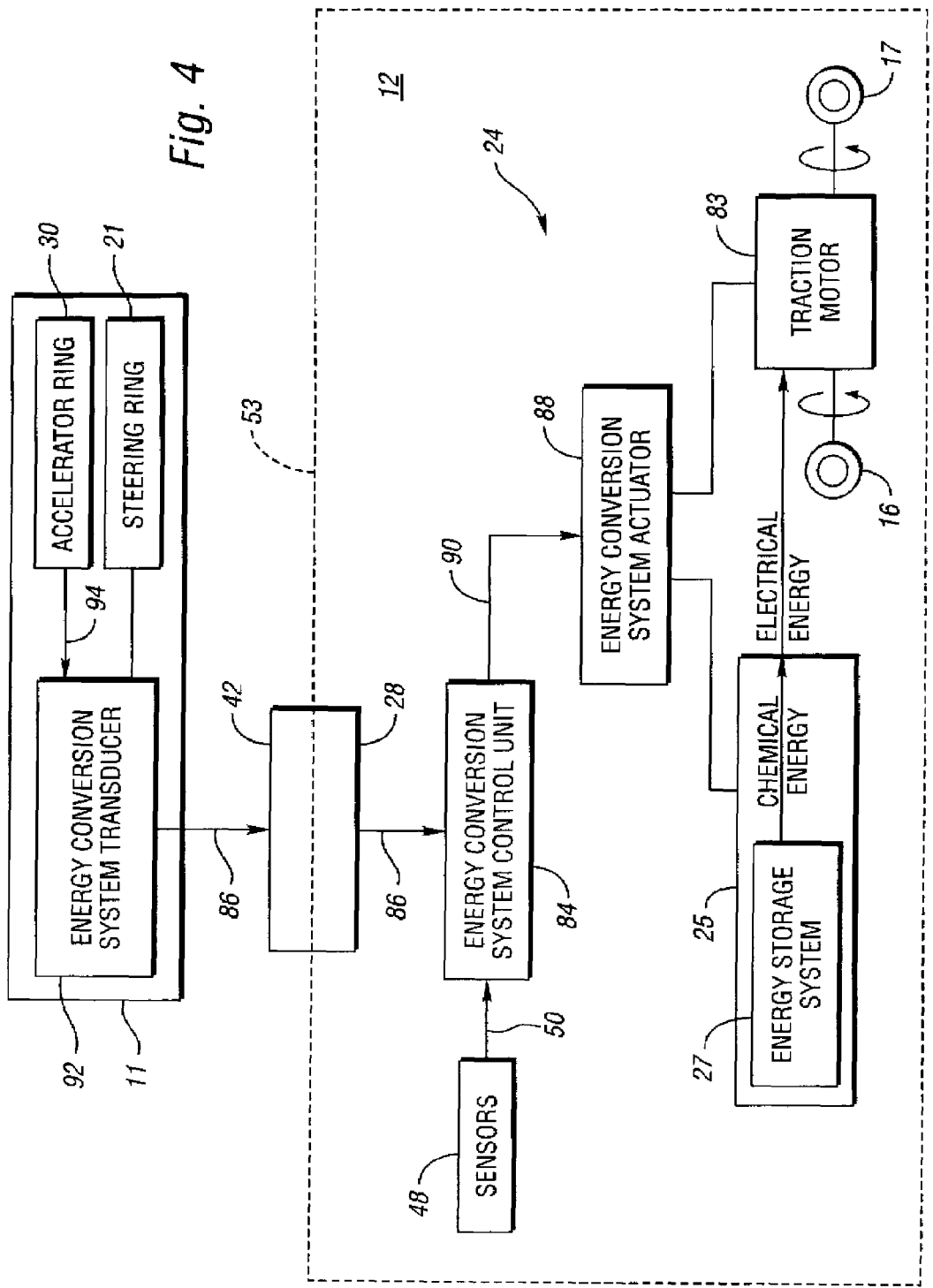
FIG. 4 is a schematic illustration of an energy conversion system for use with the vehicle of FIG. 1.

FIG. 4 is a schematic illustration of the energy conversion system 24 referenced in FIG. 1. The energy conversion system 24 includes an energy converter 25 that converts the energy stored in an energy storage system 27 to electrical energy that propels the vehicle 10. In the preferred embodiment, the energy converter 25 is operably connected to a traction motor 83. The energy converter 25 converts chemical energy into electrical energy, and the traction motor 83 converts the electrical energy to mechanical energy, and applies the mechanical energy to rotate the front wheels 16, 17. Those skilled in the art will recognize many types of energy converters 25 that may be employed within the scope of the present invention.

The energy conversion system 24 is configured to respond to non-mechanical control signals. The energy conversion system 24 of the preferred embodiment is controllable by-wire, as depicted in FIG. 4. An energy conversion system control unit 84 is connected to the connector port 28 from which it receives electrical energy conversion system control signals 86, and sensors 48 from which it receives sensor signals 50 carrying information about various vehicle conditions. In the preferred embodiment, the information conveyed by the sensor signals 50 to the energy conversion system control unit 84 includes vehicle velocity, electrical current applied, rate of acceleration of the vehicle, and motor shaft speed to ensure smooth launches and controlled acceleration. The energy conversion system control unit 84 is connected to an energy conversion system actuator 88, and transmits energy conversion system actuator control signals 90 to the energy conversion system actuator 88 in response to the electrical energy conversion system control signals 86 and sensor signals 50 according to a stored algorithm. The energy conversion system actuator 88 acts on the energy conversion system 24 or traction motor 83 to adjust energy output. Those skilled in the art will recognize the various methods by which the energy conversion system actuator 88 may adjust the energy output of the energy conversion system.

An energy conversion system transducer 92 is located in the driver control input device 11, operatively connected between the acceleration ring 30 and the steering ring 21, and connected to a complementary connector 42 engaged with the connector port 28 at the connector interface 53. The energy conversion system transducer 92 is configured to convert mechanical movement 94 of the acceleration ring 30 into electrical energy conversion system control signals 86 as the acceleration ring 30 is pressed toward the steering ring 21 by a driver.

Figure 5:
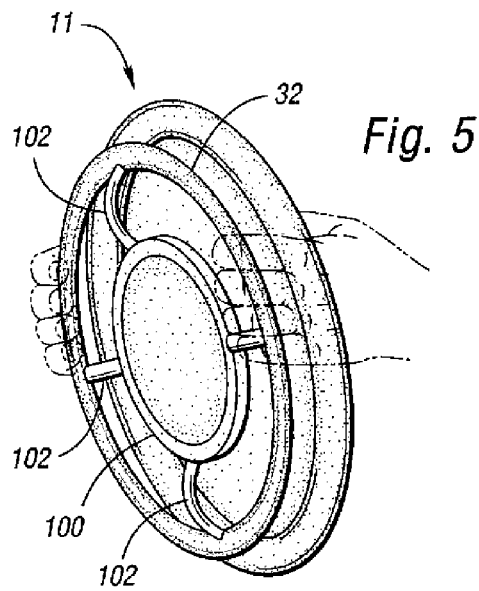
FIG. 5 is a rear perspective view of the driver control input device of FIG. 1.
Figure 6:
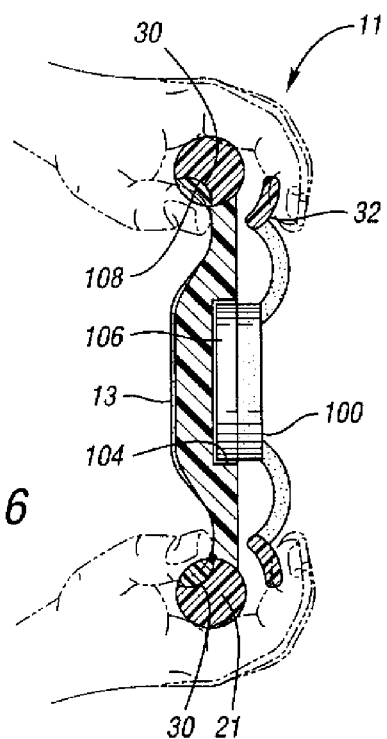
FIG. 6 is a top view of the driver control input device of FIG. 1.
Figure 7:
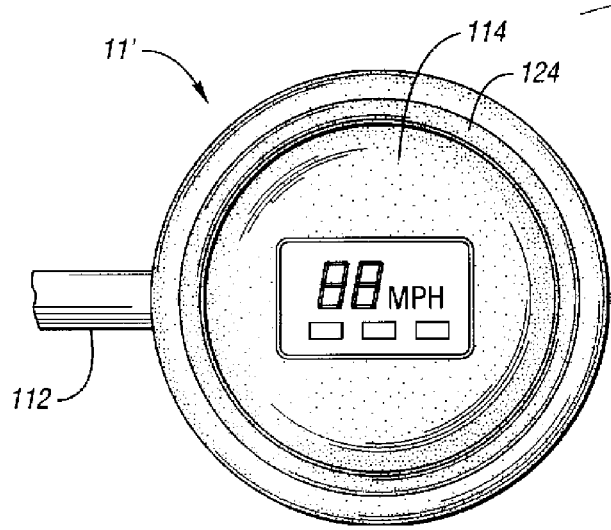
FIG. 7 is a front view of a driver control input device in accordance with a first alternative embodiment of the invention.
Figure 8:
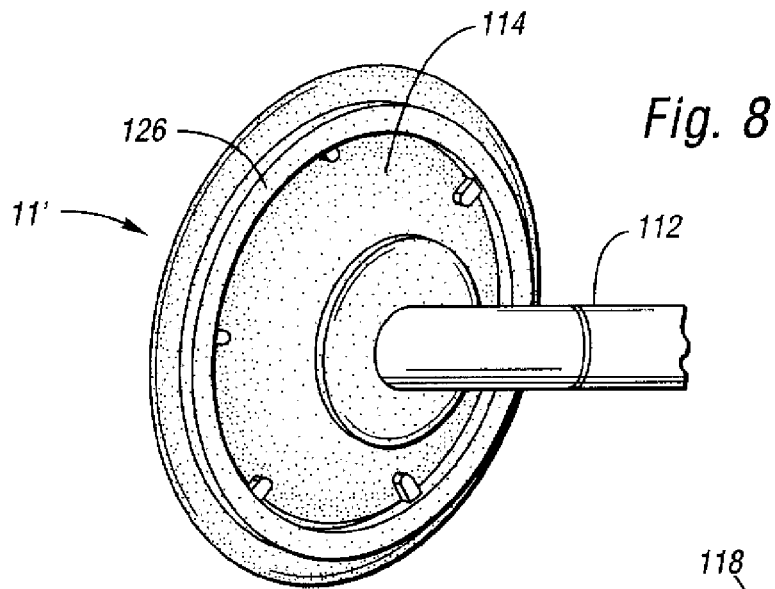
FIG. 8 is a rear perspective view of the driver control input device of FIG. 7.
Figure 9:
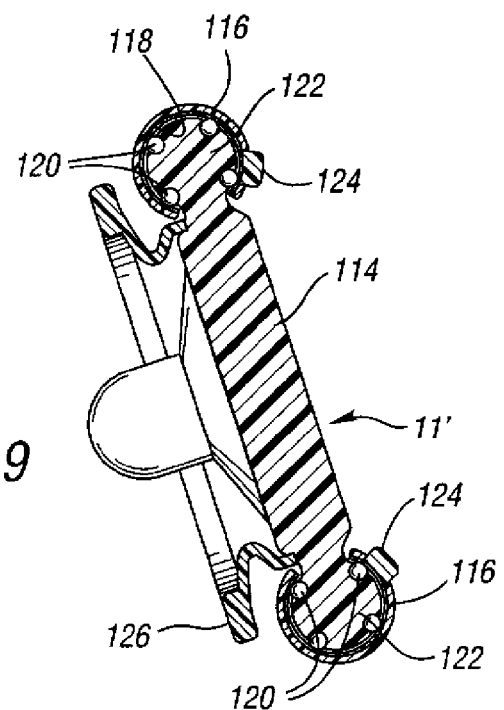
FIG. 9 is a side cross-sectional view of the driver control input device of FIG. 7.

FIGS. 5 and 6 show rear perspective and top views, respectively of the driver control input device 11 of FIG. 1. As shown, the braking ring 32 includes a cylindrical support portion 100 which is connected to the braking ring 32 by spokes 102. The braking ring 32 is positioned for convenient finger operation by the driver, as illustrated in FIGS. 5 and 6. The cylindrical center support portion 100 is movably positioned within a central aperture 104 of the hub 13. The cylindrical center support portion 100 is movable within the central aperture 104 axially against the braking transducer 106. The braking transducer 106 may, for example, be a compression-type transducer which senses movement of the cylindrical center support portion 100 against the transducer 106 and converts such movement into braking signals to be sent to the brake-by-wire system of the vehicle.

As shown in FIGS. 1 and 6, the accelerator ring 30 is positioned in a channel 108 formed around the steering ring 21. The accelerator ring 40 preferably includes a transducer (as illustrated in FIG. 4), such as an elongated compression-type transducer which senses thumb pressure of the driver, as illustrated in FIG. 6. Preferably, acceleration is proportional to force applied against the accelerator ring 30 by the driver's thumb.

Accordingly, in this embodiment, the accelerator ring 30 and braking ring 32 rotate with the steering ring 21 for convenient finger and thumb operation by the driver during steering.

Figure 10:
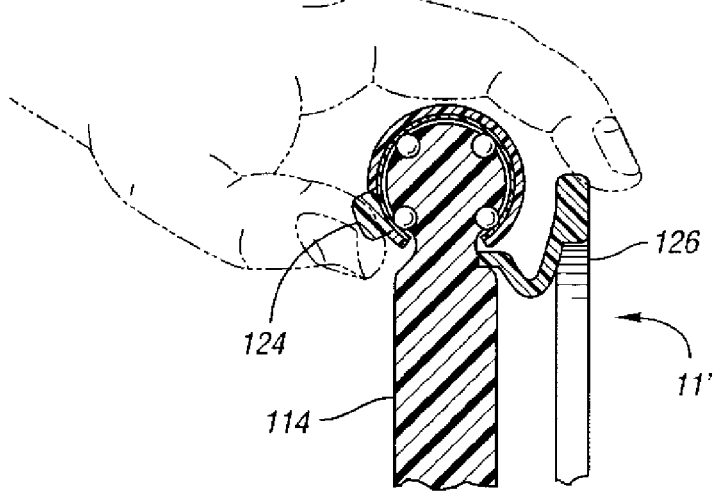
FIG. 10 is an enlarged partial side cross-sectional view of the driver control input device of FIG. 9 being operated by a driver.
Figure 11:
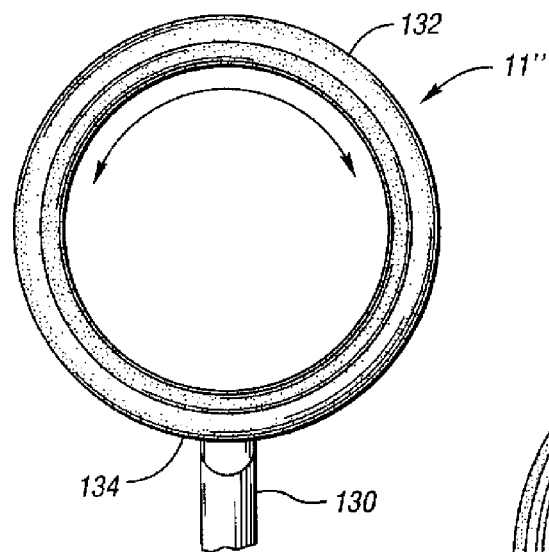
FIG. 11 is a front view of a driver control input device in accordance with a second alternative embodiment of the invention.
Figure 12:
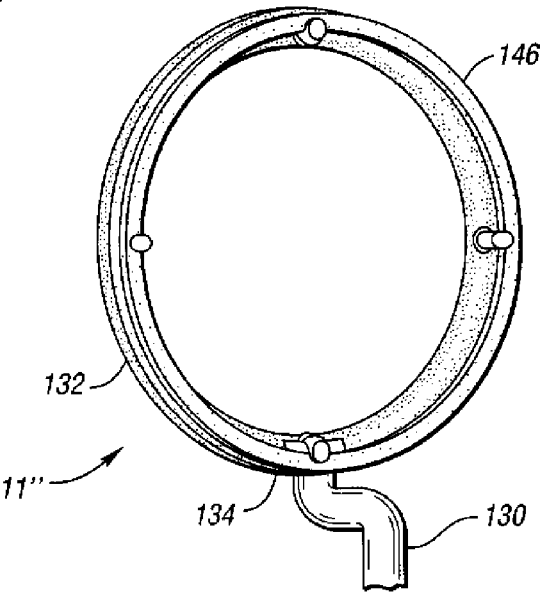
FIG. 12 is a rear perspective view of the driver control input device of FIG. 11.
Figure 13:
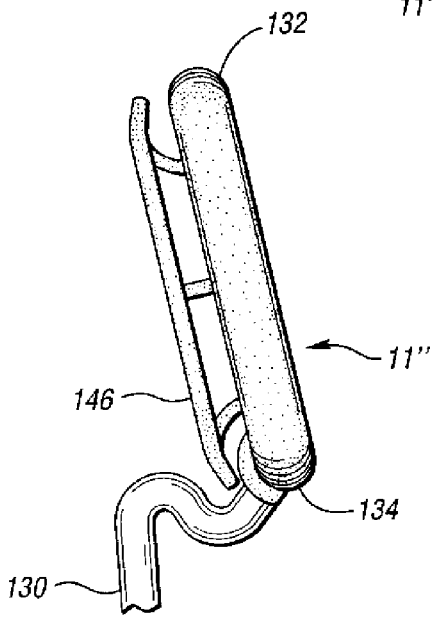
FIG. 13 is a side view of the driver control input device of FIG. 11.
Figure 14:
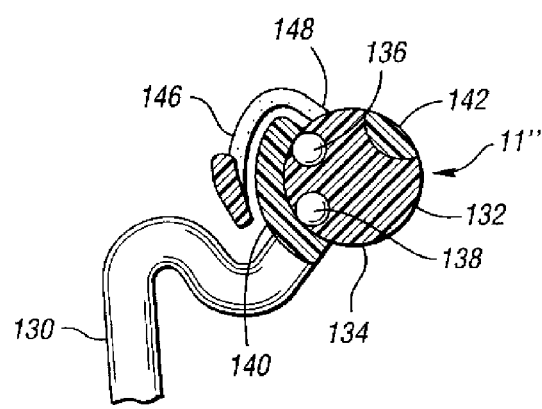
FIG. 14 is a partial side cross-sectional view of the driver control input device of FIG. 11.

Turning to FIGS. 7-10, a driver control input device 11' is illustrated in accordance with a first alternative embodiment of the invention. As shown, the driver control input device 11' includes a support post 112 which supports a fixed hub 114 having an information display, such as an LCD speedometer. The steering ring 116 is a substantially hollow, donut-shaped component having an inner surface 118 which rides along bearings 120 on the stationary wheel 122 during steering movement. A steering transducer is operatively connected between the steering ring 116 and the stationary wheel 122 (as illustrated schematically in FIG. 2) to translate mechanical rotation of the steering ring 116 with respect to the stationary wheel 122 and hub 114 into electrical steering signals to be sent to a steer-by-wire system. As shown, an acceleration ring 124 is positioned on a forward side of the steering ring 116 for convenient thumb operation by a driver, as illustrated in FIG. 10. Also, a braking ring 126 is connected adjacent a rear surface of the hub 114 for convenient finger operation by a driver, as illustrated in FIG. 10. The braking ring 126 may be fixed to the steering ring 116 for rotation therewith, or may be fixed to the hub 114. A braking transducer is operatively connected to the braking ring 126 (as illustrated schematically in FIG. 3) to translate movement of the braking ring 126 toward the hub 114 into electrical braking signals to be sent to the brake-by-wire system.

Turning to FIGS. 11-14, a second alternative embodiment of a driver control input device 11" is shown. In this embodiment, a fixed post 130 rotatably supports the steering ring 132 by engaging only the peripheral edge 134 of the steering ring 132 to thereby fully support the steering ring 132 while enabling rotation of the steering ring via bearings 136, 138. As shown most clearly in FIG. 14, the post 130 includes a support member 140 which is contoured to engage the steering ring 132 and includes bearings 136, 138 to facilitate rotation of the steering ring 132 with respect to the support member 140.

An acceleration ring 142 is positioned in a channel 144 formed around the steering ring 132. Also, a braking ring 146 is connected to the steering ring 132 and positioned at the rear side of the steering ring 132 for convenient operation by a driver's fingers. A braking transducer is operatively positioned between the braking ring 146 and the steering ring 132 (as illustrated schematically in FIG. 3). The braking transducer may sense pivoting movement of the ring 146 about the pivot point 148. It may alternatively include a compression sensor, or a sensor which senses bending of the braking ring 146 when pressed by a driver. Further, axial movement of the braking ring 146 with respect to the steering ring 132 may be sensed by the transducer and converted to electrical braking signals to be sent to the brake-by-wire system.

While the best modes for carrying out the invention have been described in detail, those familiar with the art to which this invention relates will recognize various alternative designs and embodiments for practicing the invention within the scope of the appended claims.

The invention claimed is:

1. A vehicle driver control input device comprising:
   a support post;
   a steering ring supported and rotatable with respect to the support post; and a steering transducer operatively connected between the steering ring and the support post to convert driver control input in the form of mechanical rotation of the steering ring into non-mechanical steering control signals to be sent to a steer-by-wire system; and an acceleration ring operatively connected adjacent the steering ring and engaged with an acceleration transducer to convert driver control input in the form of mechanical motion of the acceleration ring into non-mechanical acceleration control signals to be sent to an energy conversion system.

2. The vehicle driver control input device of claim 1, further comprising a hub fixed to the support post, and wherein said steering ring is rotatably supported with respect to the hub, said hub including an information display.

3. The vehicle driver control input device of claim 1, further comprising a hub fixed to said steering ring for rotation therewith.

4. The vehicle driver control input device of claim 1, further comprising a braking ring operatively connected adjacent the steering ring and engaged with a braking transducer to convert driver control input in the form of mechanical motion of the braking ring into non-mechanical braking control signals to be sent to a brake-by-wire system.

5. The vehicle driver control input device of claim 1, wherein said post rotatably supports the steering ring by engaging only a peripheral edge of the steering ring to thereby fully support the steering ring while enabling rotation of the steering ring via bearings connected to the post.

6. The vehicle driver control input device of claim 1, further comprising an acceleration button connected to said steering ring for providing non-mechanical acceleration signals to an energy conversion system.

7. The vehicle driver control input device of claim 1, further comprising a braking ring operatively connected adjacent a back side of the steering ring and an acceleration ring operatively connected adjacent a front side of the steering ring, said braking ring and acceleration ring being operable to provide non-mechanical braking signals and non-mechanical acceleration signals to a brake-by-wire system and an energy conversion system, respectively.

8. The vehicle driver control input device of claim 1, wherein said steering ring is substantially hollow and is positioned on a stationary wheel, and rotatable with respect to the stationary wheel via bearings on the stationary wheel abutting an inside surface of the hollow steering ring.

9. A vehicle driver control input device comprising:

a support post;

a steering ring rotatably supported with respect to the support post and engaged with a steering transducer to convert driver control input in the form of mechanical rotation of the steering ring into non-mechanical steering control signals to be sent to a steer-by-wire system;

a braking ring operatively connected adjacent the steering ring and engaged with a braking transducer to convert driver control input in the form of mechanical motion of the braking ring into non-mechanical braking control signals to be sent to a brake-by-wire system; and an acceleration ring operatively connected adjacent the steering ring and engaged with an acceleration transducer to convert driver control input in the form of mechanical motion of the steering ring into non-mechanical acceleration control signals to be sent to an energy conversion system.

10. The driver control input device of claim 9, wherein said post rotatably supports the steering ring by engaging only a peripheral edge of the steering ring to thereby fully support the steering ring while enabling rotation of the steering ring via bearings connected to the post.

11. The driver control input device of claim 9, wherein said braking ring and acceleration ring are configured for axial movement with respect to the rotatable steering ring.

12. The driver control input device of claim 9, further comprising a hub fixed to the post, and wherein said steering ring is rotatably supported with respect to the hub, said hub including an information display.

13. The driver control input device of claim 9, further comprising a hub fixed to said steering ring for rotation therewith.

14. The driver control input device of claim 9, further comprising an acceleration button connected to said steering ring for providing non-mechanical acceleration signals to said energy conversion system.

15. The driver control input device of claim 9, wherein said braking ring is operatively connected adjacent a back side of the steering ring, and said acceleration ring is operatively connected adjacent a front side of the steering ring.

16. The driver control input device of claim 9, wherein said steering ring is substantially hollow and is positioned on a stationary wheel, and rotatable with respect to the stationary wheel via bearings on the stationary wheel abutting an inside surface of the hollow steering ring.

* * * * *